United States Patent [19]

Finta

[11] 4,114,712
[45] Sep. 19, 1978

[54] MOTOR VEHICLE WITH SPECIAL ARRANGEMENT OF FRONT WHEELS, FRONT DOOR, DRIVER'S CABIN AND ENGINE

[76] Inventor: László Finta, 1/D, Széchenyi utca, 1054 Budapest, Hungary

[21] Appl. No.: 736,303

[22] Filed: Oct. 28, 1976

[51] Int. Cl.² ............................................. B62D 31/02
[52] U.S. Cl. ................................. 180/21; 296/28 A; 296/146
[58] Field of Search .......... 180/21; 296/28 A, 28 AB, 296/64, 146, 151

[56] References Cited

U.S. PATENT DOCUMENTS

| 3,345,104 | 10/1967 | Uliki | 180/21 |
| 3,353,840 | 11/1967 | Love | 180/21 |

Primary Examiner—Joseph F. Peters, Jr.
Assistant Examiner—Donn McGiehan
Attorney, Agent, or Firm—Young & Thompson

[57] ABSTRACT

A motor vehicle, particularly a bus, has right and left front steerable wheels whose axes are spaced a substantial horizontal distance apart in a direction lengthwise of the vehicle. The driver's cabin is in front of the left front wheel and the vehicle engine is disposed beneath the driver's cabin. A passenger door is provided on the right front side, and that door and the right front wheel are disposed one in front of the other. An assembly comprising a clutch and a torque converter and a differential is positioned, with a fuel tank, between the rear wheels of the vehicle; and a long transmission shaft extends from the engine rearwardly to this assembly. When the door is in front of the right front wheel, a spare tire can be located horizontally beneath the door and protruding forwardly of the chassis.

6 Claims, 6 Drawing Figures

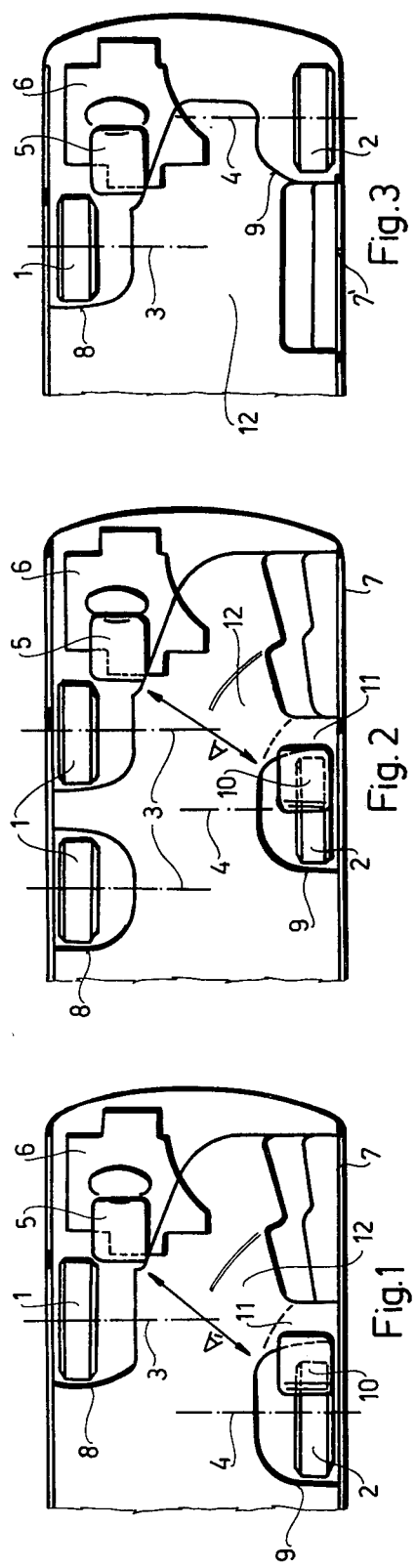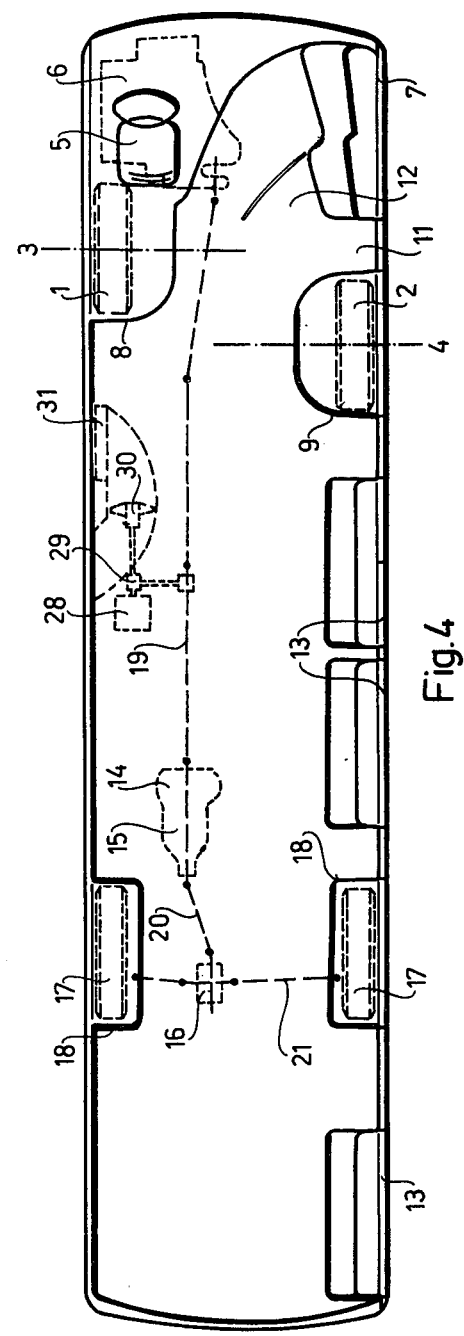

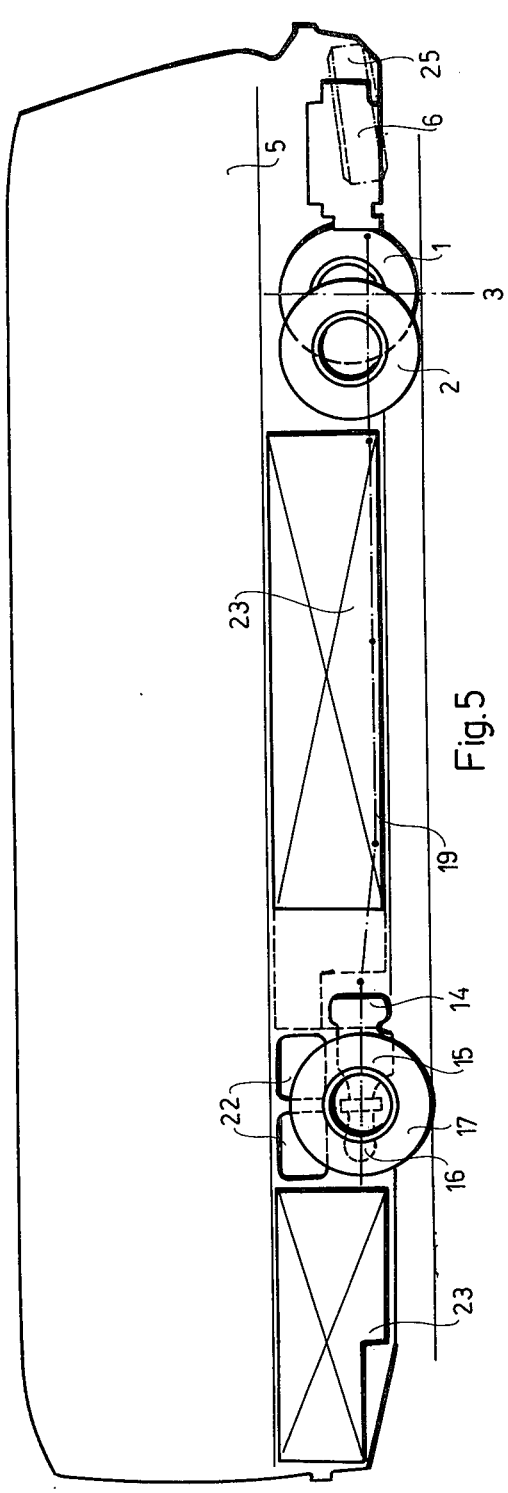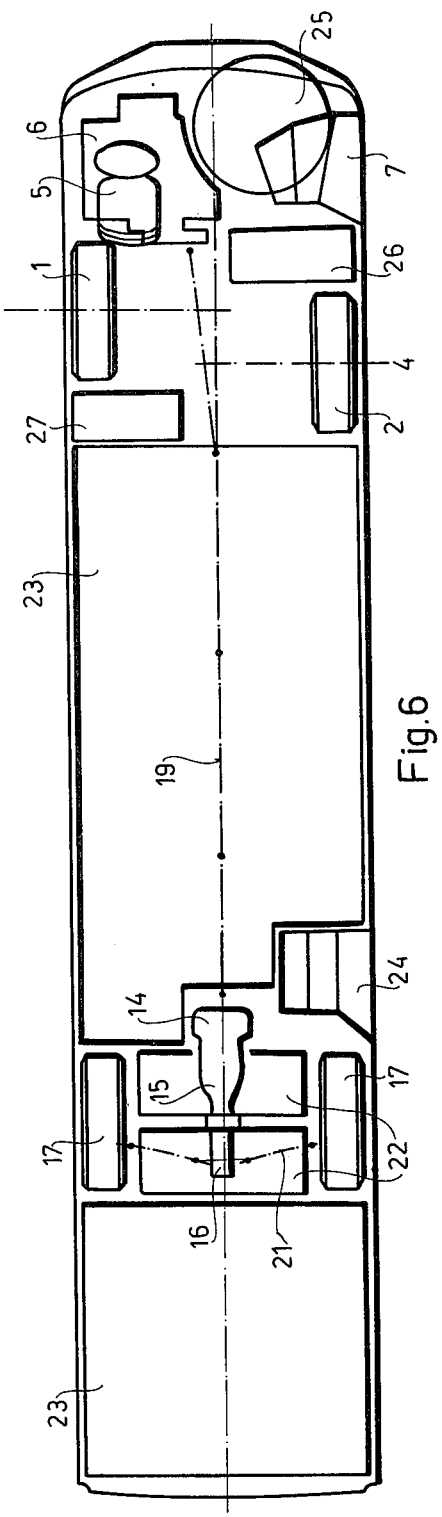

MOTOR VEHICLE WITH SPECIAL ARRANGEMENT OF FRONT WHEELS, FRONT DOOR, DRIVER'S CABIN AND ENGINE

The invention relates to an arrangement for automobiles, preferably busses, by the aid of which the wheels, the motor and all the mechanical equipment can be arranged advantageously, simultaneously enabling the expedient shaping of the floor surface and the space below the same.

The height of the floor measured from the ground level represents one of the important characteristics of modern busses. The lower the floor is, the easier getting in and out takes place; consequently sojourn in the stopping place can be reduced. The drawback lies in that under the floor the transmission cannot be expediently located.

In most busses with a lowered floor the transmission is placed at the rear of the vehicle; in another known embodiment the motor is installed within the passengers' area, beside the side wall. The basic drawback of both solutions lies in that the useful area of the vehicle has been diminished, deteriorating the economical factors; another drawback of rear-engined busses lies in that said type cannot be articulated.

Expediently the motor can be installed in that part of the bus, where the height of the floor is in any case elevated, for example the space under the driver's cabin, which has to be elevated by 30–50 cm in order to ensure better visibility and ticket collecting. In this case load on the fore-axle is disproportionally increased, the problem arising mainly when heavier motors are installed in order to increase the output of the motor; simultaneously, due to the wider passengers' doors required, the frontal overhang is too long.

The solution incorporates several other disadvantages too, for example the space requirement of the wheel wells covering the fore-wheels is considerable, thus between the wheel wells, only a narrow space is available.

Taking into consideration that the narrowed part is lying directly behind the wheel wells, the fore-part of said busses is hardly comfortable for the passengers. The arrangement is most unfortunate, where getting in and out is taking place beside the bus-driver, because all the passengers are compelled to pass the narrowed section.

The invention aims to eliminate the drawbacks enumerated above and to establish an arrangement, by the aid of which more advantageous shaping of the floor-section between the wheel wells can be achieved, simultaneously the driving motor is located before the fore-wheels and before the fore-wheels a wide door, enabling the simultaneous passing of several passengers can be provided, without the necessity of applying special tyres owing to the overload of the fore-wheels.

The invention will be described in detail by the aid of preferable embodiments and the attached drawings.

FIGS. 1 to 3 show three different preferred embodiments of the invention in diagrammatic layout, FIG. 4 in top plan view shows the schematical arrangement of an urban bus in top plan view, with a wheel arrangement according to the invention.

FIGS. 5 and 6 show the diagrammatical side-view and top plan view respectively of another bus arranged in accordance with the invention.

The essence of the invention lies in that the steered wheels 1,2 on the left and right side have longitudinally spaced axes such that the wheel 1 is located in the vicinity of the motor 6 installed under the driver's cabin 5, whereas the other wheel 2 is installed behind the wide passengers' door 7. The axial planes 3,4 of the wheels are considerably displaced longitudinally, consequently the wheel wells 8,9, covering the wheels will be displaced too, enabling the advantageous shaping of the floor 12 within the passengers' area, providing a comfortable foot-place 11 for the seat 10 located behind the passengers' door 7.

The difference between the embodiments shown in FIGS. 1 and 2 is that in the embodiment of FIG. 2 two steered wheels 1, instead of only one, are mounted on two axles behind the motor 6, and on the other side one steered wheel 2 is mounted on one axle. The embodiment can be considered as advantageous, when smaller tyres of less carrying capacity can be used.

The embodiment shown in FIG. 3 differs from that in FIG. 1 in that the steered wheel 2 has been displaced beside the motor 6 mounted below the driver's cabin 5 before the passengers' door 7, consequently in this embodiment the axial plane 4 is before the axial plane 3 and the passengers' door 7, has been arranged behind plane 4.

The embodiments shown in FIGS. 1 and 2, are expediently used in large vehicles, preferably busses, when an advantageous loading of the fore-wheels can be achieved even with heavier motors. The embodiment according to FIG. 3 serves mainly for use in busses transporting goods, small and medium busses and those suitable for cross-country driving.

FIG. 4 shows the schematical arrangement of a town bus with four doors, in which the position of the axles complies with that shown in FIG. 1. Beside the front passengers' door 7 there are further three doors 13, two of which are to be found on the side wall, between the wheels 2 and 17, the third being positioned behind the wheel 17 covered by means of wheel well 18. The clutch 14 and the torque converter 15 are mounted in the vicinity of the rear-wheels 17, transmitting the torque of the engine 6 through the transmission shaft 19 and 20 to the axle housing 16, driving the wheels 17 through the axle 21.

The bus shown in FIG. 4 can be easily converted into an articulated bus with low floor, to which a trailer-coach having displaced axles according to the invention, can be easily attached at a point of articulation (not shown) behind the rear-wheels 17.

The arrangement according to the invention can be advantageously used not only in town busses but in long-distance busses too, surpassing considerably the presently used solutions. The dimension of the luggage space which is usually formed beneath the floor of the passengers' area is characteristic for said long-distance-busses.

The drawback of the known types lies in that the motor has been installed behind the rear axle or within the floor space between the axles, consequently a considerable part of the floor space required for the luggage space has been occupied by the mechanical equipment.

FIG. 5 shows the side-view of the long-distance bus with the arrangement according to the invention; the top view of said bus is to be seen in FIG. 6.

In the embodiment shown in FIGS. 5 and 6 the luggage space is formed in such a way that all mechanical equipment is located where the luggage space could not be formed anyway; for this purpose the motor 6 is installed beneath the driver's cabin 5. The clutch 14 and the torque converter 15 are installed in the vicinity of the rear-wheels 17, before the differential in the axle housing 16. The torque of the motor is transmitted through the transmission shaft 19 and shafts 21 to the rear-wheels 17; preferably, the fuel tank 22 is positioned between the wheels 17, above the driving aggregate i.e. clutch 14, the torque converter 15 and differential 9 in the axle housing 16, whereas the spare wheel 25 is placed before the fore-wheel 2, beneath the steps of the door 7, in the floor space. The spare-wheel protrudes from the chassis as far as the bumper, partly receiving the impact energy, partly dividing impact forces and transmitting them to the chassis.

The air-conditioner 26 is in the space between the steps of the door 7 and the suspension of the wheel 2, said equipment being driven by the motor 6; the battery 27 is preferably positioned between the wheel 1 and the luggage space 23. The arrangement of the axles of the vehicle enables the use of a double-door, the second door 24 being located for example before the rear-wheel 17.

By the arrangement of the mechanical equipment a luggage space of great volume can be provided within the space beneath the floor surface, and also the floor can be lower by 10-20 cm.

In order to reduce the torsion from uneven dynamic loading and to avoid overloading the long transmission shaft 19, a part of the entirety of the rotating mass needed for the operation of the motor 6, is located in the form of a supplementary rotating mass (not shown) on the end of the transmission shaft 19, before the clutch 14. The transmission shaft 19, connected with the motor, may drive the auxiliary machinery and equipment of the vehicle; for this purpose standard devices generally used, can be applied. In the embodiment shown in FIG. 4 a transmission 29 with a bevel gear has been installed, serving for the drive of the ventilator 30 of the radiator 31 and the generator 28.

The advantages of the invention are as follows:

The driving motor can be installed befor the fore-wheel, beneath the floor of the driver's cabin; since the fore-wheels are not overloaded, the use of special tyres becomes unnecessary, tyres commonly used in practice can be used; by the application of the arrangement according to the invention busses of the same structure, having lower floors can be made either as single, or as articulated busses (busses with trailers); due to the axial displacement of the front wheels, the passage between the fore-wheel wells can be made most advantageously.

When designing long-distance busses, due to the axial displacement of the front wheels, the arrangement of the mechanical equipment allows the forming of a luggage space of standard dimension, and also the lowering the floor level by 10-20 cm in the chassis becomes also possible.

The displaced axles improve the suspension since the wheels pass obstacles with a certain difference in time, consequently spring forces giving rise to longitudinal swinging will be generated with a certain time shift.

Taking into consideration that spring forces are proportional to the load applied on the wheels, the simultaneous force provoking swinging, compared to the traditional arrangement of the wheels, will be reduced by half; similarly the rigidity of the vehicle is also improved.

The arrangement according to the invention has advantages in production too, partly because of simpler tooling resulting from the identical types, partly because of the savings in material due to the lower chassis.

What we claim:

1. A motor vehicle having right and left front steered wheels, the axes of the right and left front steered wheels being spaced a substantial horizontal distance apart in a direction lengthwise of the vehicle, a driver's cabin in front of the left front wheel, a driving engine for the vehicle below the driver's cabin, and a passenger door on the right front side of the vehicle, the right front wheel and the passenger door being arranged one in front of the other.

2. A motor vehicle as claimed in claim 1, the passenger door being in front of the right front wheel.

3. A motor vehicle as claimed in claim 1, the right front wheel being in front of the passenger door.

4. A motor vehicle as claimed in claim 1, the vehicle having rear wheels on each side thereof, an assembly comprising a clutch and a torque converter and a differential disposed between the rear wheels, there being a luggage space between said assembly and the front wheels, and a transmission shaft extending rearwardly from said engine to said assembly.

5. A motor vehicle as claimed in claim 4, and a fuel tank between said rear wheels.

6. A motor vehicle as claimed in claim 2, which has a chassis, and a spare tire horizontally disposed beneath the front door and protruding forwardly of the chassis.

* * * * *